United States Patent
Abdul-Rasool et al.

(10) Patent No.: US 10,190,511 B2
(45) Date of Patent: Jan. 29, 2019

(54) METHOD AND SYSTEM FOR A VEHICLE

(75) Inventors: Mustafa Abdul-Rasool, Järfälla (SE);
Oskar Johansson, Stockholm (SE);
Mikael Ögren, Norsborg (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/119,284

(22) PCT Filed: Jun. 7, 2012

(86) PCT No.: PCT/SE2012/050607
§ 371 (c)(1),
(2), (4) Date: Nov. 21, 2013

(87) PCT Pub. No.: WO2012/169961
PCT Pub. Date: Dec. 13, 2012

(65) Prior Publication Data
US 2014/0114542 A1 Apr. 24, 2014

(30) Foreign Application Priority Data

Jun. 10, 2011 (SE) .................................. 11503531

(51) Int. Cl.
*B60K 31/00* (2006.01)
*B60W 10/02* (2006.01)
(Continued)

(52) U.S. Cl.
CPC .............. *F02D 28/00* (2013.01); *B60K 31/00* (2013.01); *B60W 10/02* (2013.01); *B60W 10/08* (2013.01);
(Continued)

(58) Field of Classification Search
CPC ......... B60W 10/06; B60W 2030/1809; B60W 2530/10
See application file for complete search history.

(56) References Cited

U.S. PATENT DOCUMENTS

| 6,524,217 B1 | 2/2003 | Murakami et al. ............... 477/5 |
| 2003/0036839 A1* | 2/2003 | Han et al. ....................... 701/70 |

(Continued)

FOREIGN PATENT DOCUMENTS

| CN | 1675084 A | 9/2005 |
| CN | 1930412 A | 3/2007 |

(Continued)

OTHER PUBLICATIONS

International Search Report dated Oct. 17, 2012 issued in corresponding International patent application No. PCT/SE2012/050607.

(Continued)

*Primary Examiner* — Nicholas K Wiltey
(74) *Attorney, Agent, or Firm* — Ostrolenk Faber LLP (57) ABSTRACT

A method for running a vehicle (100) that includes a combustion engine (101) which can selectively be connected to a driveshaft (104, 105). When the vehicle (100) is in motion and is approaching a downgrade, determining whether the engine (101) can be disconnected from the driveshaft (104, 105) for at least a first period of time (T1), and disconnecting the driveshaft (104, 105) for at least the first period of time (T1); and the engine (101) also is switched off for the first period (T1). A system that performs the method and a vehicle that performs it are disclosed.

18 Claims, 3 Drawing Sheets

(51) Int. Cl.
  *B60W 10/08* (2006.01)
  *B60W 10/11* (2012.01)
  *B60W 10/30* (2006.01)
  *B60W 30/18* (2012.01)
  *B60W 50/00* (2006.01)
  *F02D 28/00* (2006.01)

(52) U.S. Cl.
  CPC .......... *B60W 10/11* (2013.01); *B60W 10/30* (2013.01); *B60W 30/18072* (2013.01); *B60W 50/0097* (2013.01); *B60W 2030/1809* (2013.01); *B60W 2550/141* (2013.01); *B60W 2550/143* (2013.01); *B60W 2550/402* (2013.01); *B60W 2710/1005* (2013.01); *Y02T 10/84* (2013.01)

(56) References Cited

U.S. PATENT DOCUMENTS

| | | | |
|---|---|---|---|
| 2003/0087724 A1* | 5/2003 | Seibertz | B60K 6/48 477/92 |
| 2005/0014605 A1* | 1/2005 | Ries-Mueller | 477/71 |
| 2005/0230161 A1 | 10/2005 | Terui | 180/65.3 |
| 2006/0293824 A1* | 12/2006 | Steen et al. | 701/70 |
| 2008/0015760 A1* | 1/2008 | Yamauchi | 701/67 |
| 2009/0301061 A1* | 12/2009 | Sahlen et al. | 60/285 |
| 2010/0010697 A1* | 1/2010 | Soma et al. | 701/22 |
| 2010/0125402 A1* | 5/2010 | Bansal et al. | 701/117 |
| 2010/0286884 A1* | 11/2010 | Bunn | 701/70 |
| 2010/0305789 A1* | 12/2010 | Ito | 701/21 |
| 2012/0065852 A1* | 3/2012 | Eriksson | B60W 30/18072 701/54 |
| 2012/0080001 A1* | 4/2012 | Saito et al. | 123/179.4 |

FOREIGN PATENT DOCUMENTS

| | | |
|---|---|---|
| CN | 102343910 A | 2/2012 |
| DE | 10 2009 046340 A1 | 5/2011 |
| DE | 102009046340 A1 | 5/2011 |
| EP | 1 923 291 A2 | 5/2008 |
| EP | 1923291 A2 | 5/2008 |
| GB | 2 452 579 | 3/2009 |
| GB | 2452579 A | 3/2009 |
| JP | 2000-186594 | 7/2000 |
| JP | 2000-217203 | 8/2000 |
| JP | 2001107763 | 4/2001 |
| JP | 2004504574 | 2/2004 |
| JP | 2010-30430 | 2/2010 |
| SE | 1150527 | 12/2012 |
| SE | 1150529 | 12/2012 |
| WO | WO 02/08640 | 1/2002 |
| WO | WO 2005/084995 | 9/2005 |
| WO | WO 2008/130288 A1 | 10/2008 |

OTHER PUBLICATIONS

International Preliminary Examination Report dated Sep. 6, 2013 issued in corresponding International patent application No. PCT/SE2012/050607.
English translation of a Japanese Office Action dated Feb. 10, 2015.
Japanese Office Action, dated Aug. 11, 2015, issued in corresponding Japanese Patent Application No. 2014-514839. English translation. Total 3 pages.
Chinese Office Action dated Jul. 27, 2015 issued in Chinese Application No. 201280028187.5 with an English language translation.
Korean Office Action dated Aug. 21, 2015 issued in Korean Application No. 10-2014-7000675 with an English language translation.
First Examination Report dated Oct. 3, 2018 in corresponding Indian Patent Application No. 9802/DELNP/2013.

\* cited by examiner

METHOD AND SYSTEM FOR A VEHICLE

CROSS-REFERENCE TO RELATED APPLICATIONS

The present application is a 35 U.S.C. §§ 371 national phase conversion of PCT/SE2012/050607 filed Jun. 7, 2012, which claims priority of Swedish Application No. 1150531-0, filed Jun. 10, 2011, the contents of which are incorporated by reference herein. The PCT International Application was published in the English language.

FIELD OF THE INVENTION

The present invention relates to a method and a system for running a vehicle in situations where a reduced power requirement for propulsion of said vehicle prevails. The present invention relates also to a vehicle and to a computer program and a computer program product which implement the method according to the invention.

BACKGROUND TO THE INVENTION

Cruise controls are now usual in motor vehicles, e.g. cars, trucks and buses. A purpose of cruise control is to achieve a uniform predetermined vehicle speed, and the cruise control may be of traditional type aiming at constant vehicle speed. This may be achieved by adapting the engine torque to avoid retardation, e.g. by increasing the engine torque uphill. A general purpose for cruise control is to achieve convenient running of the vehicle and also greater comfort for its driver.

A driver of a vehicle with cruise control function usually sets a speed $v_{cc}$ which he/she wishes the vehicle to maintain until the cruise control function is for any reason deactivated. The cruise control then determines a reference speed $v_{ref}$ which it demands from the portion of the vehicle's control system which controls the vehicle's engine, e.g. an engine control unit.

If the cruise control function is of traditional type as above, $v_{ref}$ will be equal to the set speed $v_{cc}$, in which case the vehicle continually endeavors to maintain the speed $v_{cc}$ set by the driver. A cruise control function of this kind thus causes the vehicle to try to maintain the speed set irrespective of whether it is travelling uphill, downhill or on a horizontal running surface. This means that the vehicle may be accelerated over the crest of a hill, only to be immediately braked on a subsequent downgrade to avoid exceeding the set speed $v_{cc}$. This method is thus an uneconomic way of running the vehicle, particularly in the case of heavy vehicles.

It is generally the case that apart from the vehicle's procurement cost the main items of expenditure for its routine operation comprise driver pay, repair and maintenance costs and fuel to power the vehicle, and the fuel cost may very greatly affect profitability for an owner of the vehicle, e.g. a haulage company or the like.

For this reason there are functions which endeavour to modify the running of the vehicle on the basis of knowledge of its itinerary, so that its fuel consumption can be kept as low as possible. This may for example be achieved by means of cruise control functions whereby the reference speed $v_{ref}$ can be allowed to deviate from the speed $v_{set}$ chosen by the driver, on the basis of knowledge of the vehicle's itinerary, in order thereby to run the vehicle in a more fuel-economising way.

An example of such a cruise control is one which uses a so-called "look-ahead" function. A look-ahead cruise control (LACC) is a cruise control which uses knowledge of road sections ahead, i.e. knowledge of the nature of the itinerary ahead of the vehicle, to determine the reference speed signal $v_{ref}$ and thus also to modify the vehicle's speed according to variations of the road along which the vehicle travels.

Heavy vehicles often have automatically operated gearboxes whereby gear changes are controlled by means of a suitable on-board control system, e.g. a gearbox control system. The vehicle's LACC system assistance may also be largely controlled by one or more of the vehicle's control systems so that the vehicle runs as economically as possible, e.g. by somewhat reducing its speed at the end of an upgrade immediately followed by a downgrade on which the vehicle will be subject to a positive force component provided by gravity in the direction of travel, making it possible for the vehicle to accelerate without any positive driving force from its engine.

SUMMARY OF THE INVENTION

An object of the present invention is to propose a method for running a vehicle which can further reduce the fuel consumption of vehicles powered by a combustion engine, particularly on downhill runs.

The vehicle is provided with a combustion engine which can selectively be connected to at least one driveshaft, to deliver driving force to said driveshaft for propulsion of said vehicle. When said vehicle is in motion, the method comprises when said vehicle is approaching a downgrade, determining whether said engine can be disconnected from said at least one driveshaft for at least a first period of time, and when it is determined that said engine can be disconnected from said at least one driveshaft for said at least first period of time, disconnecting said engine from said at least one driveshaft for said first period of time, during which period said engine is also switched off.

This affords the advantage that the vehicle's fuel consumption can be further reduced compared with the reduction previously achieved by prior art. According to the present invention, this is done by not only disconnecting the engine from the vehicle's tractive wheels but by also switching it off for the period of time when it is disconnected from said driveshaft. This is also done only in situations where it is deemed advantageous to switch off the engine, which is therefore arrived at by determining whether it is possible for the engine to be switched off for at least said first period of time.

This determination may for example be done by means of a look-ahead function as above, i.e. on the basis of data concerning the gradients of the vehicle's itinerary, and/or on the basis of data concerning the road topography of the vehicle's itinerary. Such data can be used, preferably in conjunction with the vehicle's current location, which may for example be obtained by means of a positioning and/or navigation system, e.g. a satellite positioning system, to predict the occasions during a journey when it will be advantageous to disconnect the engine from the tractive wheels and also to switch the engine off. Said first period of time may for example comprise a certain number of seconds, e.g. any desired number of seconds within the range 2-60 seconds.

Said first period may also be set on various bases. It may for example be based on the fuel saving from switching said engine off and it may for example comprise a period of time which at least results in reduced fuel consumption corresponding to the fuel consumption arising from starting said engine with a starter motor.

Switching the engine off according to the present invention makes it possible to achieve reduced fuel consumption not only relative to situations where the engine is only disconnected from the tractive wheels but also relative to situations in which it has previously been regarded as obvious that the vehicle should be run with said engine connected to said driveshaft but no fuel supply. The present invention results in still lower fuel consumption when the vehicle, because its tractive wheels are not subject to any engine braking force, can travel with the engine disconnected for a longer distance after passing a downgrade, since with the engine disconnected it will reach a higher speed downhill than with the engine connected to its tractive wheels.

Moreover, again owing to the tractive wheels not being subject to any engine braking force, the vehicle's speed will decrease less quickly, making it possible with the engine disconnected to travel further beyond the end of the downgrade than with the engine connected to the tractive wheels.

This means that in cases where the vehicle is moving faster than, for example, a set cruise control speed at the end of a downgrade it can travel a longer distance after the end of the downgrade before its speed drops back to the set speed and the power train has therefore to be closed to enable the engine to provide driving force in the vehicle's direction of travel.

Thus the present invention makes it possible to reduce the downhill fuel consumption of vehicles powered by a combustion engine.

An embodiment of the present invention does not conduct said determination of whether said engine can be disconnected from said at least one driveshaft for at least a first period of time, but determines instead whether it should be started by means of its starter motor or by being reconnected to the tractive wheels.

Further characteristics of the present invention and advantages thereof are indicated by the detailed description of embodiment examples set out below and the attached drawings.

DETAILED DESCRIPTION OF EMBODIMENTS

Figure 1A:
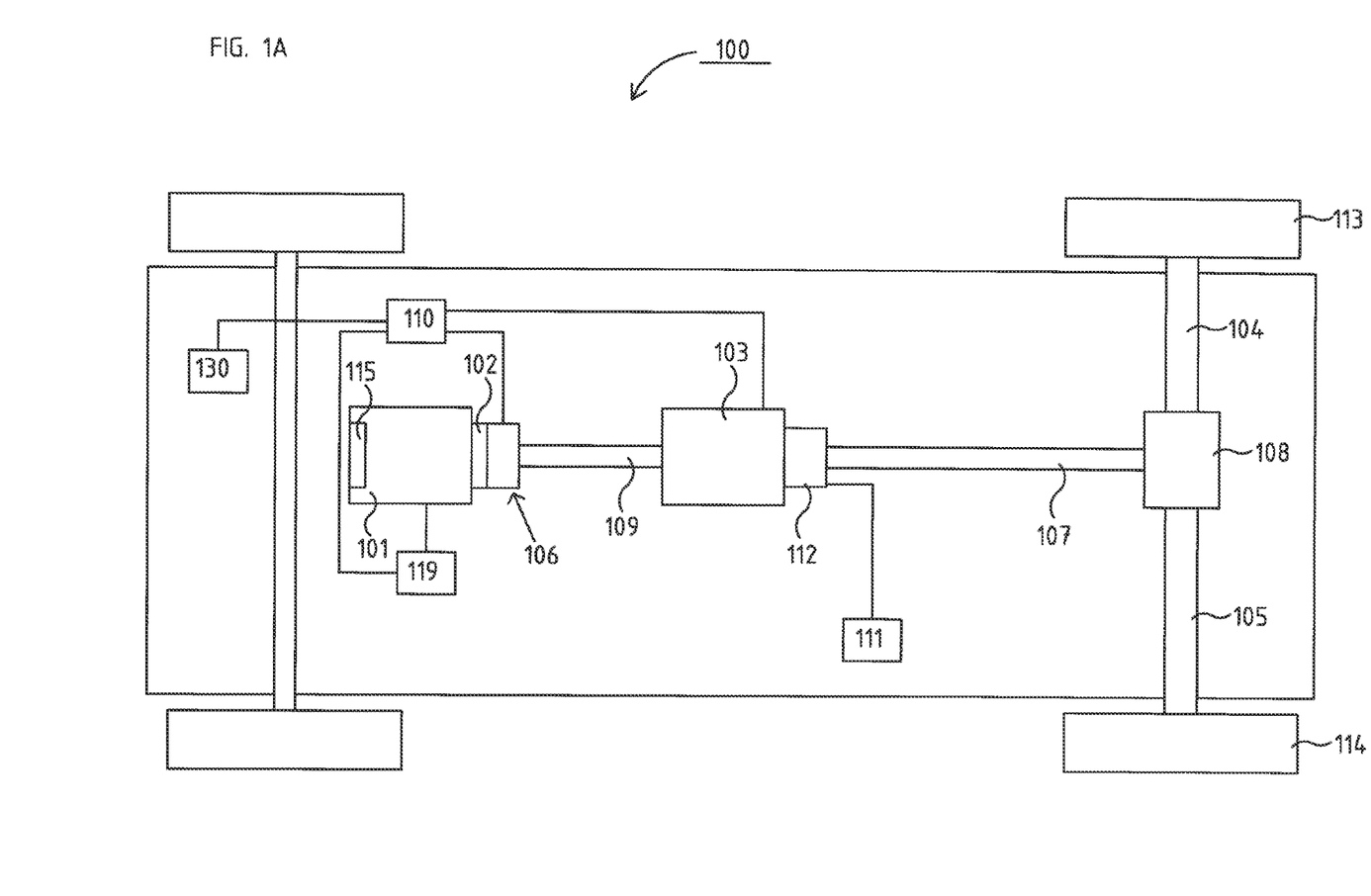
FIG. 1A depicts a power train in a vehicle in which the present invention may be used.

FIG. 1A depicts schematically a power train in a vehicle 100 according to an embodiment of the present invention. The power train comprises a combustion engine 101 which in a conventional way is connected, via an output shaft of the engine, usually via a flywheel 102, to an input shaft 109 of a gearbox 103 via a clutch 106. The clutch may for example take the form of an automatically controlled clutch and be controlled by the vehicle's control system via a control unit 110. The control unit 110 controls also the gearbox 103. The vehicle 100 further comprises driveshafts 104, 105 which are connected to the vehicle's tractive wheels 113, 114 and are driven by an output shaft 107 from the gearbox 103 via an axle gear 108, e.g. a conventional differential. A starter motor 115 is also provided for starting the engine 101.

The vehicle 100 further comprises various different brake systems, e.g. a conventional service brake system, which may for example comprise brake discs with associated brake linings (not depicted) situated adjacent to each wheel. The service brake system is controlled by the vehicle's control system by means of a brake control unit 111 which in a conventional way sends signals to, for example, the regulator or regulators which regulate the braking force in the service brake system.

The brake control unit 111 may also be adapted to controlling other brake systems on board the vehicle as well as the service brake system. Heavy vehicles are often provided with further brake systems, e.g. in the form of conventional retarders 112 and/or other supplementary brake systems such as various kinds of exhaust brake systems, compression brake systems, electromagnetic brake systems and engine brakes. On the basis of commands initiated by the vehicle's driver and/or other control units, the control unit 111 sends control signals to suitable system modules to demand desired braking force. Supplementary brake systems may also be controlled directly by the driver, e.g. via buttons or pedals, in which case the pedal or lever may be directly connected to another control unit which sends information to, for example, a retarder control unit.

Control systems in modern vehicles generally comprise a communication bus system consisting of one or more communication buses for connecting together a number of electronic control units (ECUs), or controllers, and various components onboard the vehicle. Such a control system may comprise a large number of control units and the responsibility for a specific function may be divided between two or more of them. Vehicles of the type here concerned are therefore often provided with significantly more control units than depicted in FIG. 1A, as one skilled in the art will surely appreciate. The vehicle depicted in FIG. 1A is also provided with a control unit 130 in which a look-ahead function for using, for example, a so-called "look ahead" cruise control (LACC) as above is implemented.

In the embodiment depicted, the present invention is implemented in the control unit 130 but might also be implemented wholly or partly in one or more other control units already on board the vehicle or a control unit dedicated to the present invention.

The control exercised by the control unit 110 over the gearbox 103 will thus depend not only upon, for example, an engine control unit 119 but also upon information received from the control unit 130.

Control units of the type here concerned are normally adapted to receiving sensor signals from various parts of the vehicle, e.g. the control unit 110 may receive sensor signals from the gearbox 103 and signals from, for example, the brake control unit 111 and the engine control unit 119 as well as the control unit 130. Control units of the type here concerned are also usually adapted to delivering control signals to various vehicle parts and components. In the present example, the control unit 130 delivers signals to the control unit 110 which itself delivers signals to various control devices to demand desired gear ratios in the gearbox 103 and opening/closing of the clutch 106.

Control is often governed by programmed instructions, typically in the form of a computer program which, when executed in a computer or a control unit, causes the computer/control unit to effect desired forms of control action, e.g. method steps according to the present invention.

The computer program usually takes the form of a computer program product 129 which is stored on a digital storage medium 121 (see FIG. 1B), e.g. ROM (read-only memory), PROM (programmable read-only memory), EPROM (erasable PROM), flash memory, EEPROM (electrically erasable PROM), a hard disc unit etc., in or connected to the control unit, and which is executed by the control unit. The vehicle's behavior in a specific situation is therefore modifiable by altering the computer program's instructions.

Figure 1B:
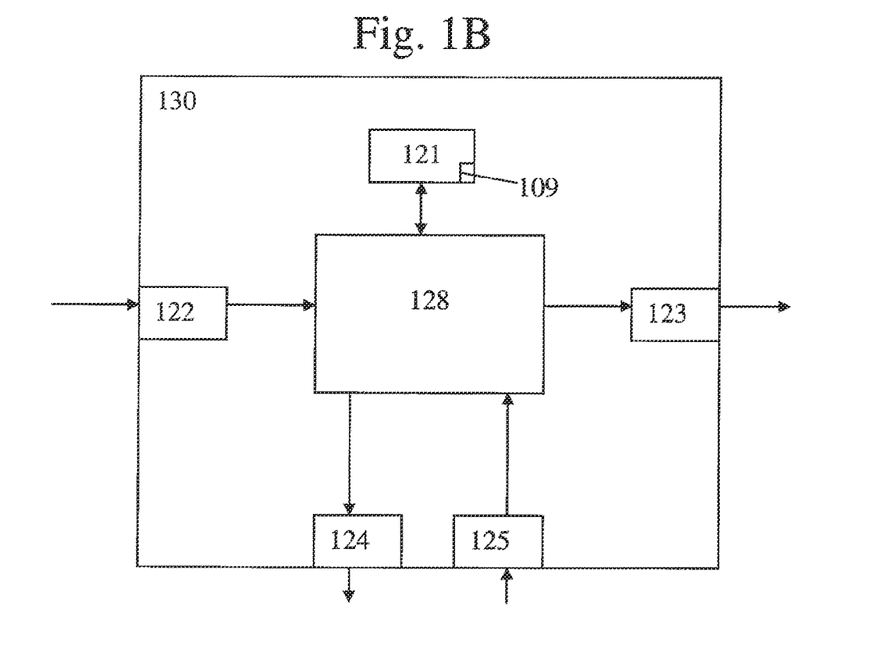
FIG. 1B depicts a control unit in a vehicle control system.

An example of a control unit (the control unit 130) is depicted schematically in FIG. 1B, possibly comprising a calculation unit 128 which may for example take the form of some suitable type of processor or microcomputer, e.g. a circuit for digital signal processing (Digital Signal Processor, DSP), or a circuit with a predetermined specific function (Application Specific Integrated Circuit, ASIC). The calculation unit 128 is connected to a memory unit 121 which provides it with, for example, the stored program code 129 and/or the stored data which the calculation unit needs for it to be able to perform calculations. The calculation unit 128 is also arranged to store partial or final results of calculations in the memory unit 121.

The control unit is further provided with respective devices 122, 123, 124, 125 for receiving and sending input and output signals. These input and output signals may comprise waveforms, pulses or other attributes which the input signal receiving devices 122, 125 can detect as information and which can be converted to signals which the calculation unit 128 can process. These signals are therefore conveyed to the calculation unit 128. The output signal sending devices 123, 124 are arranged to convert signals received from the calculation unit 128 in order, e.g. by modulating them, to create output signals which can be conveyed to other parts of the vehicle's control system and/or the component/components for which the signals are intended. Each of the connections to the respective devices for receiving and sending input and output signals may take the form of one or more from among a cable, a data bus, e.g. a CAN (Controller Area Network) bus, an MOST (Media Orientated Systems Transport) bus or some other bus configuration, or a wireless connection.

In vehicle situations where a reduced driving power requirement prevails or will prevail, e.g. on downgrades, measures as above may be adopted to reduce fuel consumption. Depending on the downgrade's gradient angle the vehicle 100 will be acted upon by a larger or smaller positive force in its direction of travel, i.e. the gradient will cause the force of gravity to exert in the vehicle's direction of travel a positive force component, thereby helping to propel the vehicle and consequently reducing or completely eliminating, depending on the gradient angle, the need for driving force from the engine 101.

For example, the vehicle may be run in a mode whereby the engine 101 is disconnected from the tractive wheels 113, 114, i.e. the power train is opened. This disconnection by opening the power train may for example be achieved by putting the gearbox 103 into neutral or by opening the clutch 106. Disconnecting the engine from the tractive wheels when the vehicle is in motion is referred to below as freewheeling.

Another way of running the vehicle when a reduced driving power requirement prevails or will prevail is in a mode with the power train closed, i.e. with the engine connected to the tractive wheels, while at the same time the fuel supply to the engine is shut off. An advantage of this mode of running the vehicle is that since the fuel supply to the engine is shut off its fuel consumption will also be nil. This measure does however mean that the engine will be driven by the tractive wheels via the power train, a situation known as "dragging" in which the engine's internal losses give rise to a braking force/negative driving force on the tractive wheels, i.e. the vehicle is engine-braked.

The engine's internal losses are usually related to its speed in such a way that they increase with increased engine speed, and hence too the engine braking force, so dragging is usually conducted with as high a gear as possible engaged in the gearbox (i.e. in as low a gear ratio as possible) to reduce to the utmost the engine's speed, and hence also its losses, during dragging.

In the case of freewheeling, however, the tractive wheels are not subject to any engine braking effect at all, which means that the vehicle will roll more easily downhill and thereby also reach a higher speed at the end of a downgrade as compared with dragging. This speed increase is however achieved at the cost of the fuel consumption required to keep the engine running at idling speed.

Depending on the nature of the downgrade, different strategies for dealing with it may be variously advantageous. The parallel Swedish patent application 1150529-4 entitled "METHOD AND SYSTEM PERTAINING TO VEHICLES II", with the same inventor, applicant and filing date as the present application, and the parallel Swedish patent application 1150527-8 entitled "METHOD AND SYSTEM PERTAINING TO VEHICLES I", likewise with the same inventor, applicant and filing date as the present application, exemplify strategies for reducing a vehicle's fuel consumption when it is at least partly run by freewheeling.

"METHOD AND SYSTEM PERTAINING TO VEHICLES I" specifically describes a method whereby freewheeling is advantageous in situations where dragging would likewise result in a speed increase and freewheeling has historically not been employed. The present invention is also applicable in such situations, as therefore described in more detail in said patent application. It also describes how freewheeling will generally result in reduced fuel consumption compared with dragging, and the reason for this is also described in detail in said patent application.

The character of fuel consumption differs when running respectively in a mode in which the engine is dragged and a mode in which the vehicle freewheels. As previously mentioned and as described in detail in said patent application "METHOD AND SYSTEM PERTAINING TO VEHICLES I", the fuel consumption arising from keeping the engine running at idling speed during freewheeling is counterbalanced by the lower running resistance due to the tractive wheels not being subject to any engine braking force. The lower running resistance means that the vehicle can travel with the engine disconnected for a longer distance after passing a downgrade, partly because it will reach a higher speed downhill as compared with running with the engine connected to the tractive wheels, and partly because, since the tractive wheels are not subject to any engine braking force, the vehicle's speed will decrease less quickly than when dragging, even from the same initial speed.

The present invention does however make it possible for fuel consumption to be reduced further in situations where a reduced driving force requirement prevails or will prevail, e.g. before/on a downgrade.

Figure 2:
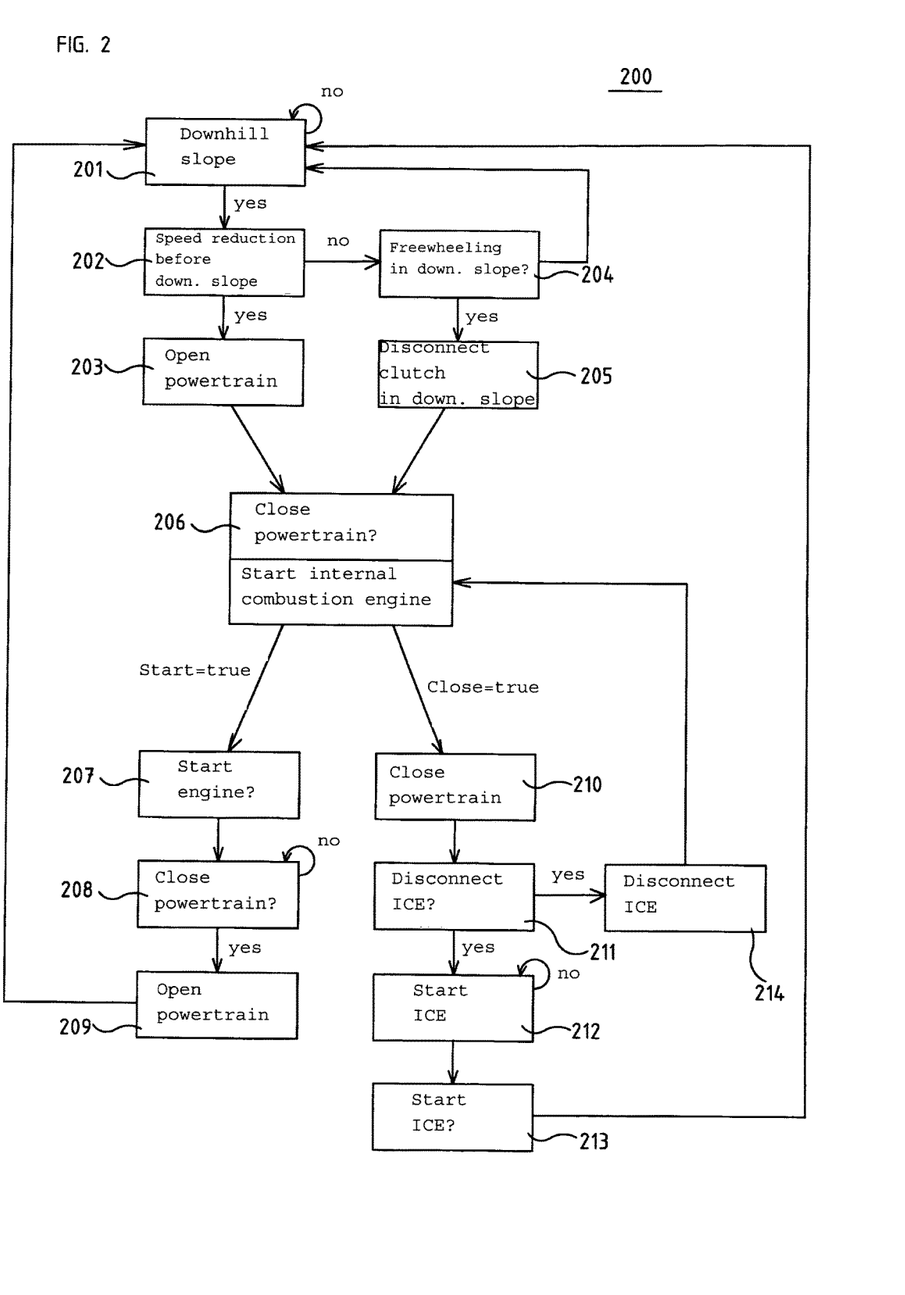
FIG. 2 illustrates an example of a method according to the present invention.

An example of a method 200 is depicted in FIG. 2, beginning with a step 201 which determines whether the vehicle is approaching a downgrade. This determination may be done continuously until it is determined that the vehicle will reach a downgrade within, for example, a certain time, e.g. a certain number of seconds, or within a certain distance, e.g. a certain number of meters, e.g. 100 m, 200 m, 300 m etc.

This determination may be conducted by means of a look-ahead function, e.g. a look-ahead function for a look-ahead cruise control (LACC) which may therefore be implemented in the control unit 130 in FIG. 1A. The LA function may also be implemented in any other on-board control unit. As above, the LACC uses knowledge of the nature of the road ahead to modify the vehicle's speed according to prevailing circumstances. Knowledge of the road section ahead may for example comprise prevailing topography, road curvature, traffic situation, condition of road and speed limitations for the section ahead, and also traffic signs adjacent to the road.

On the basis of this LA information and vehicle location information which may for example be obtained in the form of information from suitable positioning/navigations systems such as a telemast system and/or a satellite navigation system, e.g. GPS (global positioning system) information, the LA function can estimate how much time and/or distance remains before a coming downgrade. Weather reports/data from weather meters may also be used when for example strong tail/headwinds might affect the driving force required for the vehicle's propulsion.

When thereafter at step 201 it is found that the vehicle is approaching a downgrade, possibly while still on an upgrade or on a horizontal running surface, the method moves on to step 202.

Step 202 determines whether a speed decrease should take place before the coming downgrade. The LACC system makes it possible for the vehicle to be largely controlled by the vehicle's control system so that the vehicle runs as economically as possible, e.g. by reducing its speed at the end of an upgrade or along a level section of road leading to a downgrade on which a positive contribution from the force of gravity will accelerate the vehicle without any contribution from its engine.

This speed decrease may be effected by dragging but also at least partly by freewheeling. The aforesaid parallel Swedish patent application 1150529-4 entitled "METHOD AND SYSTEM FOR RUNNING OF VEHICLES II" describes a method whereby the vehicle is already allowed to freewheel before reaching a downgrade. According to an embodiment, a speed decrease before a downgrade according to the method described in said patent application is achieved by freewheeling. If step 202 determines that a speed decrease should be effected by freewheeling, the method moves on to step 203 which disconnects the engine from the tractive wheels to achieve speed decrease by freewheeling. If step 202 determines that there should be no speed decrease, e.g. because the road's permissible speed increases on or immediately after the downgrade, which may for example be determined on the basis of LA/GPS data, in which case it may for this reason be advantageous to allow the vehicle's speed to increase to the utmost on the downgrade, the method moves on to step 204, which determines instead whether freewheeling should take place when the vehicle reaches the downgrade, in which case the method moves on to step 205 to disconnect the engine from the tractive wheels.

According to the present invention, however, steps 202 and 204 determine not only whether the engine should be disconnected from the tractive wheels in order to freewheel, but also whether the vehicle should freewheel with the engine switched off. According to the present invention, the vehicle may thus also run with no fuel consumption when freewheeling. Freewheeling with the engine switched off thus has the benefit both of the advantages generally arising from freewheeling as compared with dragging, i.e. lower running resistance as above, and at the same time the advantages arising from dragging, i.e. no fuel consumption because the engine is switched off.

As previously mentioned, steps 202, 204 thus conduct determinations of whether the engine should be switched off. This is done by determining whether it can be disconnected from the tractive wheels for at least a first period of time T1 before the power train has for any reason to be closed again. Said first period T1 may for example be set at a certain number of seconds, e.g. at least 2, 3, 5 or 10 seconds. The period T1 chosen may for example be such as to be long enough to ensure that the power train is not opened and closed at too short intervals of time, e.g. with regard to driver comfort or vehicle wear.

According to an embodiment, said first period of time T1 is determined in such a way that the fuel saving due to the engine being switched off for a period T1 at least corresponds to the fuel consumption involved in subsequently starting the engine by means of the starter motor 115. Running the starter motor will use up a certain amount of fuel in unburnt form before the engine starts. It will also involve using electrical energy which has then to be fed back to an accumulator, e.g. a battery, by loading the engine with a generator load. Determining the time for which the engine can run on the corresponding amount of fuel and, in an embodiment, also converting the electrical energy used for driving the starter motor to a corresponding amount of fuel makes it possible to determine whether the vehicle can be freewheeled long enough with the engine switched off for the switching off to be profitable.

The time T1 may also be the time for which the engine can run on a corresponding amount of fuel (plus any electrical energy consumed as above) plus a suitable offset to compensate for the extra wear on components caused by starting/stopping the engine.

Determining the time T1 for which the engine can be switched off may also be done by means of the aforesaid LA function, i.e. on the basis of data concerning the gradients of the itinerary ahead of the vehicle, and/or on the basis of data concerning the road topography along the itinerary and/or the vehicle's location.

When it has thereafter been determined that the engine can be disconnected from the tractive wheels for at least said first period of time, it is therefore so disconnected at steps 203/205 and is switched off, e.g. at substantially the same time as the power train is opened. According to an embodiment, the engine's fuel supply is shut off first, resulting in the vehicle being dragged even before the power train is opened and the engine therefore stops.

After the vehicle's power train has been opened and the engine has been switched off, the method moves on to step 206 to determine whether the power train should be closed and/or the engine be restarted. There are various possible reasons for closing the power train and restarting the engine. For example, the vehicle will at the latest begin to retard when the downgrade ends. Depending on the nature of the downgrade, the vehicle may retard even on the downgrade, and if its speed drops to a set minimum, which may for example be set for driver comfort (which might be disturbed if the speed decrease is allowed to become too great) or for cost reasons (if the vehicle is repeatedly allowed to deviate downwards too far from, for example, a set speed pertaining to an activated cruise control function or prevailing speed limit, the vehicle's total journey time may be adversely affected, with correspondingly increased costs in terms of driver pay etc.), the power train may be closed and the engine be restarted to accelerate the vehicle back to desired speed. If instead the nature of the downgrade is such that the vehicle has been retarded but its current speed exceeds desired speed, the freewheeling may be allowed to continue beyond the point where the downgrade ends until the vehicle has dropped to desired speed.

The present invention may also be employed in conjunction with the methods described in the parallel patent applications identified above, in which case switching off as in the present invention may be employed in all freewheeling situations therein occurring so long as the freewheeling can proceed for at least said first period of time T1, in which case freewheeling with the engine switched off is discontinued at the same stage as in said parallel patent applications.

According to another example, the vehicle's engine may for example be restarted if the driver suddenly operates the brake or if for example an adaptive cruise control (which may for example be used to maintain a desired distance from a vehicle in front) detects an obstacle on the vehicle's itinerary, in which case it may be desirable for the engine to be restarted to ensure that all of the vehicle's functions work properly at times of evasive action, panic braking or the like.

There are also situations where it may be determined that the engine should be restarted despite no inherent need for freewheeling to be discontinued. If for example the brake pressure in a pneumatic brake system falls suddenly below a minimum pressure, the engine may be restarted to make it possible to run a compressor to raise the pressure in the pneumatic brake system.

If it is determined at step 206 that the engine should be restarted, e.g. for any of the reasons described above, the method moves on to step 207 to restart it, and then to step 208 to determine whether the power train also should be closed. If the engine has for example been restarted because of too low brake pressure, it may still be that the vehicle should freewheel for a further period of time, e.g. the remainder of any downgrade on which it still is at the time. It may also be that at the end of the downgrade the vehicle is still above set speed, in which case it is usually advantageous to allow it to freewheel beyond the end of the downgrade until its speed drops to, for example, set speed (it may also be that it is allowed to drop below set speed). When thereafter step 208 determines that the power train should be closed, e.g. because the vehicle drops to set speed some distance after the end of the downgrade, it is closed at step 209 and the method goes back to step 201 pending the vehicle having to travel another downgrade or freewheel again in the course of a downgrade. If the engine is restarted when the vehicle is already on a downgrade, method 200 may be repeated to determine whether freewheeling with the engine switched off might be resumed at any stage during the remainder of the downgrade. Said parallel patent application "METHOD AND SYSTEM FOR RUNNING OF VEHICLES II" exemplifies situations where freewheeling might be activated more than once in the course of a downgrade and the present invention is therefore applicable.

If step 206 determines that the power train should be closed, e.g. for the vehicle to be dragged, the method moves on to step 210 to close the power train. Vehicles of the type here concerned often have an upper speed limit $V_{KFB}$ which is not to be exceeded, e.g. because of government regulations or because the vehicle's manufacturer states a maximum speed. The speed $V_{KFB}$ may also be set by the vehicle's driver. If this speed is reached, the vehicle will usually automatically begin using supplementary brake systems to ensure that it is not exceeded. For this reason it may for example be advantageous to switch to dragging in certain situations in order thereby to apply an engine braking torque which may reduce the risk of exceeding $V_{KFB}$. The method then moves on to step 211 to determine whether freewheeling should be resumed. If such is not the case, the method moves on to step 212 to determine whether the engine should be restarted, e.g. because the vehicle has passed the downgrade and the driving power requirement has increased. The engine is then restarted at step 213 and the method goes back to step 201 for another determination as above.

If at the end of the downgrade the vehicle is travelling faster than the set speed it may as above be advantageous to freewheel past the end of the downgrade until the vehicle drops to, for example, set speed. If step 211 determines that the vehicle should resume freewheeling, the method moves on the step 214 to again disconnect the engine from the tractive wheels, followed by going back to step 206 to determine whether the power train should be closed, e.g. because the vehicle's speed after the downgrade has decreased to a desired extent.

Starting the engine 101 was exemplified above by being effected by means of a starter motor 115. The number of stops, and consequently starts, of the engine may increase markedly when running a vehicle according to the present invention. For this reason, the starter motor on a vehicle 100 where the present invention is employed may be replaced by a more powerful starter motor than is normally used on similar vehicles not employing the present invention. Using a more powerful motor affords the advantage of taking less time to accelerate the engine to a speed at which it can start. Reducing the time the engine takes to start makes it possible to reduce also the amount of unburnt fuel arising from starting it. It also means that the aforesaid period T1 may be shorter while at the same time switching the engine off remains profitable.

Using a more powerful starter motor also affords the advantage that it will be subject to less wear than a less powerful motor, making it possible to reduce or fully compensate for the adverse effects of running the vehicle according to the present invention upon the service life of the starter motor and associated components.

In the above description, the engine is started by means of the vehicle's starter motor. According to an embodiment, said engine is instead started by being connected to the vehicle's tractive wheels, i.e. by the power train being closed, in which case fuel supply may commence when the tractive wheels have caused the engine to turn fast enough to be able to start. According to an embodiment, the engine is accelerated to at least an idling speed before fuel supply commences, in order to avoid unacceptable and sudden engine speed changes during starting (the speed required for the engine to be able to start is usually substantially below the idling speed). According to another embodiment, the power train is closed fully, causing the engine to run at a specific speed which depends on gear choice in the gearbox and on the vehicle's prevailing speed before fuel supply commences, i.e. the vehicle switches first to dragging, whereupon the engine is "started" by supply of fuel.

Starting the engine by closing the power train affords the advantage that starting can be conducted substantially without losses, at least if the power train has accelerated the engine to at least idling speed before fuel supply commences, in which case fuel supplied will burn immediately and thereby produce propulsive power.

According to this embodiment, the vehicle freewheels at a still lower cost than when dragging. As above, freewheeling also affords the advantage that the vehicle will as above reach higher speeds, or be retarded less quickly, and will therefore run at a higher average speed potentially leading, likewise as above, to positive effects on driver pay costs etc.

Starting the engine by closing the power train may be preceded by determining whether this should take place with highest gear (lowest gear ratio) engaged in the gearbox 103 or with a lower gear engaged. This determination may be based on LA data as above. If for example the downgrade is followed by a level section of road, starting may for example be conducted with highest gear engaged, whereas if the downgrade is followed by an upgrade it may instead be advantageous to start the engine with a lower gear engaged to avoid having to make one or more rapid downward gear changes immediately after the engine has started.

An embodiment of the present invention involves choice of strategy for starting the engine, i.e. whether starting it after freewheeling with no fuel supply should be by means of the starter motor or by closing the power train.

This determination may for example be done already at the time of determining that the vehicle should freewheel or when the freewheeling should be discontinued.

It may for example be advantageous for comfort reasons to start the engine by means of the starter motor if a certain number of downward gearchange steps will be required immediately after the freewheeling ends, e.g. because the downgrade is followed by an upgrade. If the engine is started by means of the starter motor, downward changes to desired gears may take place in a desired way, e.g. by changing down immediately to a desired gear before the power train is closed, or in a desired sequence in a controlled way. If the vehicle is instead started by closing the power train, unacceptable jerking may occur if for example the engine has to be started in a relatively low gear because the downgrade is followed by a steep upgrade.

According to the present invention, methods for starting the engine may thus be chosen on the basis of data concerning the itinerary ahead of the vehicle.

As indicated above, when the vehicle is in motion, there are functions which are necessary to enable it to run safely, and these functions may be dependent on the engine. An example is a pneumatic brake pressure system as above, a function which can be maintained for at least a certain time after the engine has been switched off.

There are however also functions which may be directly dependent on rotation of the engine's output shaft, e.g. a conventional steering servo function. If the engine is switched off, the steering servo function will also be switched off in cases where it is powered by the engine's output shaft, rendering steering wheel movements more burdensome for the driver. According to an embodiment, the method according to the invention is therefore only employed in conditions where the itinerary ahead of the vehicle is relatively straight, limiting the need for large steering wheel movements.

Another embodiment of the present invention uses instead a steering servo function which is independent of the rotation of the engine's output shaft. This may for example be achieved by means of an electrically driven steering servo pump, in which case the servo function can be maintained even when the engine is switched off.

An embodiment uses a combination of conventional steering servo pump driven by the engine when running and an electric steering servo pump used when freewheeling with the engine switched off. There may also be other functions and/or ancillaries which are normally powered by the engine but for which an electric solution may be advantageous at least at times when the engine is switched off.

The present invention is not restricted to the invention's embodiments described above but relates to and comprises all embodiments within the protective scope of the attached independent claims.

The invention claimed is:

1. A method for running a vehicle having a combustion engine, a starter motor and a driveshaft to which the engine is selectively connected to deliver driving force to the driveshaft for propulsion of the vehicle when the vehicle is in motion, the method comprising:
   determining that the vehicle is approaching a downgrade within a period of time or within a specified distance;
   in response to the determination that the vehicle is approaching a downgrade, determining, based on look ahead data obtained for the vehicle, a look ahead data-based freewheel period of time, the look ahead data-based freewheel period of time being at least a period during which the vehicle is on the downgrade;
   determining whether the look ahead data-based freewheel period of time is at least as long as a predetermined first period of time such that an amount of fuel reduction when the engine is switched off for the entirety of the first period of time is at least a first predetermined amount of fuel consumed when the engine is started by the starter motor; and
   only when the determination is made that the look ahead data-based freewheel period of time is at least as long as the predetermined first period of time, disconnecting the engine from the driveshaft for the entirety of the look ahead data-based freewheel period, and switching off the engine for the entirety of the look ahead data-based freewheel period.

2. A method according to claim 1, wherein the fuel reduction for vehicle operation when the engine is switched off during the first period of time is equal to or greater than an amount of fuel consumption required when the engine is started by a starter motor.

3. A method according to claim 1, wherein the first predetermined amount of fuel is greater than or equal to:
   an amount of fuel consumption required for starting the engine by the starter motor plus any amount of fuel corresponding to electrical energy used to run the starter motor plus the first amount of fuel to compensate for wear on engine and vehicle components caused by the engine starting and stopping upon the disconnection of the engine from the driveshaft.

4. A method according to claim 1, wherein the determining whether the engine should be disconnected from the driveshaft for at least the entirety of the first period of time is based on at least one of data concerning an itinerary ahead of the vehicle including road gradients of the itinerary, and
   data concerning a road topography of the itinerary ahead of the vehicle, and
   the vehicle's location.

5. A method according to claim 1, further comprising activating a cruise control function for the vehicle configured for setting a speed of the vehicle upon the determining of whether the engine should be disconnected from the driveshaft for the entirety of the first period of time.

6. A method according to claim 1, wherein the vehicle is permitted to freewheel by disconnecting the engine and the driveshaft and switching off the engine, and the method further comprises:

restarting the engine by connecting the engine to the driveshaft.

7. A method according to claim 1, further comprising:
when determining that the engine should be disconnected from the driveshaft, making an engine restart determination comprising determining whether to restart the engine by engaging a starter motor or by connecting the engine to the driveshaft,
wherein the engine restart determination is based on data concerning an itinerary ahead of the vehicle,
wherein the first predetermined amount of fuel includes an amount of fuel consumption required for starting the engine by a starter motor plus an amount of fuel corresponding to electrical energy used to run the starter motor.

8. The method according to claim 7, wherein the restart determination is made before the determining of whether the engine should be disconnected from the driveshaft for at least the first period of time.

9. A method according to claim 1, wherein the vehicle further comprises a gearbox which is configured to be set to a first number of fixed gear ratios; and
when the engine is to be connected to the driveshaft, determining which of the fixed gear ratios is to be set in the gearbox based on data concerning an itinerary ahead of the vehicle.

10. A method according to claim 1, wherein the determining whether the engine should be disconnected from the driveshaft for at least a first period of time is performed by a control unit situated in a control system of the vehicle.

11. A method according to claim 10, wherein the first period of time is at least two seconds.

12. A non-transitory computer-readable medium incorporating program code which, when the program code is executed in a computer, causes the computer to apply the method according to claim 1.

13. A system for running a vehicle with a combustion engine which is selectively connected to a driveshaft for the engine to deliver driving force to the driveshaft for propulsion of the vehicle, and a starter motor, the system comprising:

a look ahead device configured to determine that the vehicle is approaching a downgrade within a period of time or within a specified distance;
a freewheeling period determining device configured to determine, when the vehicle is in motion and in response to the determination that the vehicle is approaching a downgrade, based on look ahead data obtained for the vehicle, a look ahead data-based freewheeling period of time, the look ahead data-based freewheel period of time being a period during which the vehicle is on the downgrade;
determining whether the look ahead data-based freewheel period of time is at least as long as a predetermined first period of time such that an amount of fuel reduction for the vehicle operation when the engine is switched off for the entirety of the first period of time is at least a first predetermined amount of fuel consumed when the engine is started by the starter motor; and
a disconnect device configured to disconnect, only when the determining device determines that the look ahead data-based freewheel period of time is at least as long as the predetermined first period of time, disconnecting the engine from the driveshaft for at least the entirety of the look ahead data-based freewheel period of time and switching off the engine for the entirety of the look ahead data-based freewheel period of time.

14. A system according to claim 13, wherein the device for disconnecting the engine from the driveshaft opens a clutch of the vehicle and/or puts the gearbox into a neutral state.

15. A vehicle including a system according to claim 13.

16. A vehicle according to claim 15, further comprising a steering servo which operates substantially independently of rotation of the engine's output shaft.

17. A vehicle according to claim 15, further comprising the starter motor, the starter motor more powerful than a starter motor of a vehicle of similar size and capacity.

18. The vehicle according to claim 15, wherein the first period of time is a period during which the vehicle is on a downgrade.

* * * * *

UNITED STATES PATENT AND TRADEMARK OFFICE
CERTIFICATE OF CORRECTION

PATENT NO. : 10,190,511 B2
APPLICATION NO. : 14/119284
DATED : January 29, 2019
INVENTOR(S) : Mustafa Abdul-Rasool, Oskar Johansson and Mikael Ögren

Page 1 of 1

It is certified that error appears in the above-identified patent and that said Letters Patent is hereby corrected as shown below:

On the Title Page (30) Foreign Application Priority Data should read as follows:
June 10, 2011   (SE) .............................. 1150531-0

Signed and Sealed this
Nineteenth Day of March, 2019

Andrei Iancu
*Director of the United States Patent and Trademark Office*